US008344196B2

(12) United States Patent
Harvey et al.

(10) Patent No.: US 8,344,196 B2
(45) Date of Patent: *Jan. 1, 2013

(54) SELECTIVE ISOMERIZATION AND OLIGOMERIZATION OF OLEFIN FEEDSTOCKS FOR THE PRODUCTION OF TURBINE AND DIESEL FUELS

(75) Inventors: Benjamin G. Harvey, Ridgecrest, CA (US); Michael E. Wright, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,290

(22) Filed: Apr. 27, 2011

(65) Prior Publication Data
US 2012/0209044 A1    Aug. 16, 2012

Related U.S. Application Data

(60) Continuation-in-part of application No. 12/511,796, filed on Jul. 29, 2009, and a continuation-in-part of application No. 12/550,973, filed on Aug. 31, 2009, and a continuation-in-part of application No. 12/769,757, filed on Apr. 29, 2010, and a division of application No. 13/095,201, filed on Apr. 27, 2011, and a division of application No. 13/095,245, filed on Apr. 27, 2011.

(51) Int. Cl.
C07C 2/32 (2006.01)
C07C 1/24 (2006.01)

(52) U.S. Cl. ......... 585/327; 585/329; 585/517; 585/521

(58) Field of Classification Search .................. 585/327, 585/329, 517, 521
See application file for complete search history.

(56) References Cited

U.S. PATENT DOCUMENTS

| 4,165,301 | A | 8/1979 | Wiegers et al. | |
|---|---|---|---|---|
| 4,209,653 | A | * | 6/1980 | Sato et al. ............... 585/313 |
| 4,410,749 | A | 10/1983 | Burdette | |
| 4,922,047 | A | 5/1990 | Chen et al. | |
| 5,723,709 | A | 3/1998 | Phillips, Jr. et al. | |
| 5,847,247 | A | 12/1998 | Conte et al. | |
| 6,828,283 | B2 | 12/2004 | Chapaton et al. | |
| 2008/0015395 | A1 | 1/2008 | D'Amore et al. | |
| 2009/0299109 | A1 | 12/2009 | Gruber et al. | |

OTHER PUBLICATIONS

Dunn, R.O., J. Am. Oil Chem. Soc. 2002, 79, 709-715.

* cited by examiner

*Primary Examiner* — Thuan D Dang
(74) *Attorney, Agent, or Firm* — Charlene A. Haley

(57) ABSTRACT

A process from converting alcohol feedstock to diesel/turbine fuels.

18 Claims, 1 Drawing Sheet

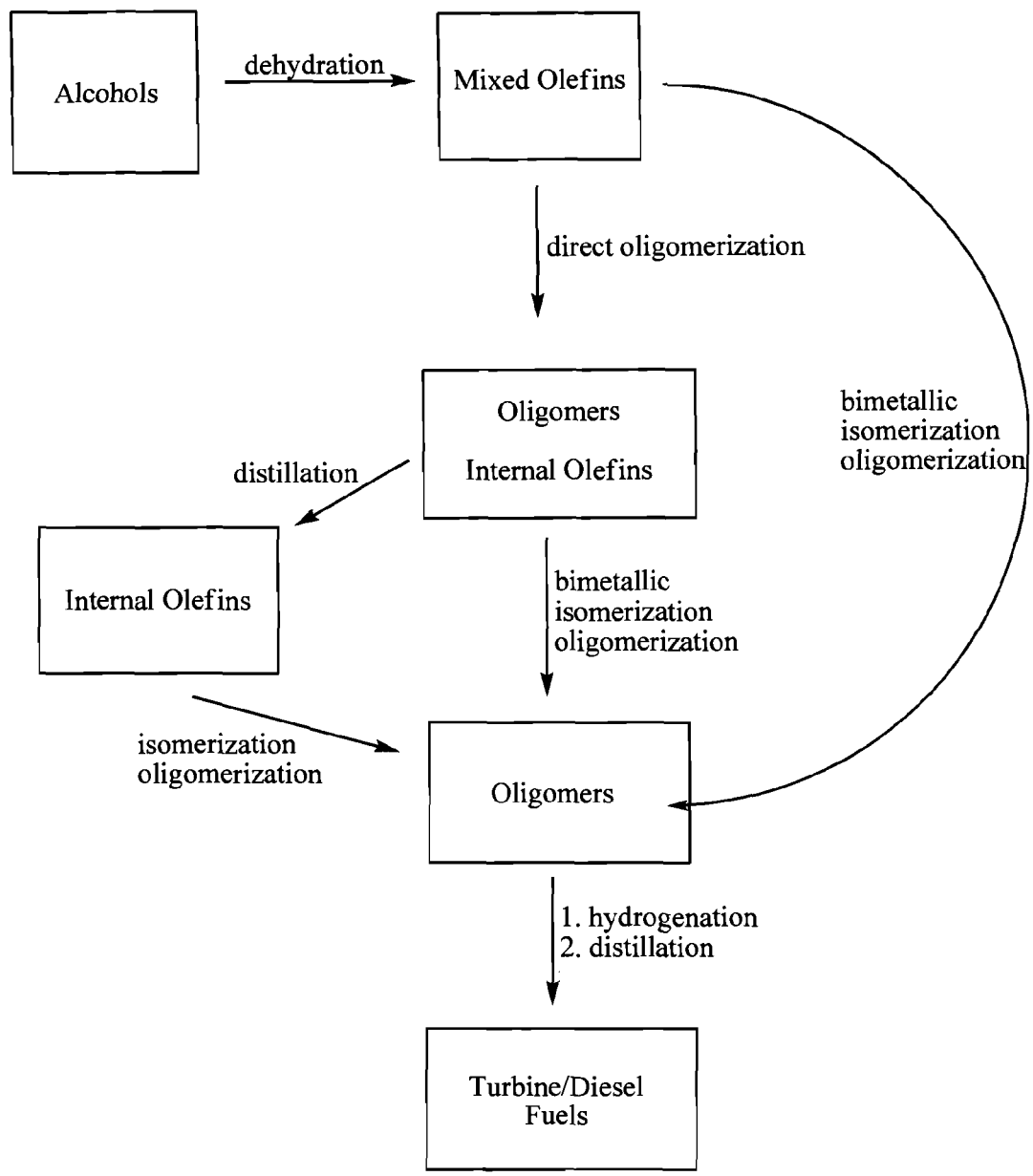

SELECTIVE ISOMERIZATION AND OLIGOMERIZATION OF OLEFIN FEEDSTOCKS FOR THE PRODUCTION OF TURBINE AND DIESEL FUELS

CROSS-REFERENCE TO RELATED APPLICATIONS

This is a continuation-in-part patent application, claiming the benefit of, parent application Ser. No. 12/511,796 filed on Jul. 29, 2009 and Ser. No. 12/550,973 filed on Aug. 31, 2009 which are co-pending and this is a continuation-in-part patent application, claiming the benefit of patent application Ser. No. 12/769,757 filed on Apr. 29, 2010, which is a continuation-in-part, whereby the entire disclosure of which is incorporated hereby reference. This is also a divisional patent application claiming benefit of patent application Ser. No. 13/095,201 filed on Apr. 27, 2011, and a divisional of patent application claiming benefit of patent application Ser. No. 13/095,245 filed on Apr. 27, 2011, whereby the entire disclosures of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to processes for converting alcohol feedstocks to diesel/turbine fuels, and more specifically, using catalytic methods to efficiently convert biofeedstocks into diesel/turbine fuels.

BRIEF DESCRIPTION OF THE DRAWING

FIG. 1 is a generic diagram for the conversion of mixed olefin feedstocks to turbine and diesel fuels, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Embodiments of the invention generally relate to processes for converting alcohol feedstocks to diesel/turbine fuels.

Several technologies exist for the oligomerization of short chain olefins. Oligomerizations catalyzed by Ziegler Natta catalysts have been shown to result in desired distributions of isomers. One drawback of this approach is that these catalysts are only effective with primary olefins. The use of a bimetallic catalyst system to isomerize internal olefins with concomitant conversion of primary olefins to oligomers allows for efficient conversion of mixed olefin feedstocks to fuels suitable for both jet and diesel propulsion.

The fermentation of sugars derived from biomass to alcohols is a proven and effective method for the conversion of sustainable feedstocks to fuels. Although fuels such as ethanol, n-butanol and more recently, n-pentanol have utility as gasoline replacements, certain applications (e.g. jet aircraft propulsion, military vehicles) require fully saturated hydrocarbon fuels. Alcohols can be dehydrated to olefins with modest energy inputs and the olefins can subsequently be oligomerized to produce saturated fuels. The use of specific Ziegler Natta catalysts under controlled conditions has been shown to be an effective route for conversion of primary olefins to jet fuels. In part, the suitability of such fuels is due to their well controlled branching coupled with chain length selectivity. Dehydration of longer chain alcohols (e.g. C4-C20) typically produces a mixture of internal, external and branched chain olefins. To address this issue, embodiments of the invention combine an isomerization catalyst with the Ziegler-Natta oligomerization catalyst. The isomerization catalyst produces an equilibrium mixture of olefins including a significant amount of primary olefins. The Ziegler Natta catalyst can then convert the primary olefin to oligomer which then allows for the further conversion of remaining internal olefins. In summary, the synergistic effect of the bimetallic system allows for internal olefins to be effectively converted to specific distributions of oligomers.

Solid acid catalysts including, but not limited to, zeolites, cation exchange resins, polyphosphoric acid and aluminosilicate clays can effectively oligomerize mixed olefin feedstocks. These methods are in general far less selective than the current approach. An isomerization-polymerization catalyst based on a titanium trichloride-nickel chloride-triethylaluminum catalyst has been described in the literature. Catalyst systems in embodiments of the invention do not produce high molecular weight polymer, but instead are selective for well defined oligomer distributions.

Selective isomerization/oligomerization of olefin precursors allows for the custom synthesis of saturated, hydrocarbon fuels from renewable feedstocks. This in turn reduces the carbon footprint of the fuel production process without sacrificing vehicle performance.

Pure or mixed alcohol feedstocks (e.g. ethanol, propanols, butanols, pentanols . . . ) are derived from renewable sources, and are subsequently dehydrated with a solid acid catalyst at elevated temperature, in the range between about 200° C. and about 400° C. Potential catalysts include, but are not limited to; gamma alumina, transition metal oxides, aluminum phosphate, and other heterogeneous catalysts of modest acidity. In an embodiment, catalysts that produce mainly (>80%) primary olefins are utilized. In the case of alcohol feedstocks that only include internal alcohols, the choice of catalyst is dictated by overall conversion efficiencies and not by selectivity to primary olefins.

In embodiments, the mixed olefin feedstock can be converted to oligomers by two routes. When the feedstock is sufficiently rich in primary olefins (20-80%), or >80%, the olefins can be directly oligomerized by a metallocene based Ziegler Nana catalyst with methylaluminoxane (MAO) cocatalyst Al:Zr=100:1 as described in U.S. patent application Ser. No. 12/511,796 which is hereby in its entirety incorporated by reference. This transformation results in the quantitative conversion of the normal olefins to an oligomer mixture, while internal olefins are untouched. The unreacted olefins can be separated by a low temperature distillation and then converted to a specific distribution of oligomers through the use of a bimetallic isomerization/oligomerization catalyst comprised of a metallocene based catalyst in conjunction with an isomerization catalyst.

In alternative embodiments, the isomerization catalyst can be added directly to the reaction mixture without separation.

The isomerization catalyst can be selected from a list of modest Lewis acids that promote isomerization without affecting the oligomerization process. Examples include, but are not limited to transition metal catalysts based on; Ni(II), Zn(II), Pd(II), Pt(II), CO), V(II), V(III), and Co(II). These catalysts can be added with or without ligands, typically with a Lewis Acid:Metallocene ratio in the range of from about 0.1 to about 10, or alternatively from about 0.5 to about 2. The isomerization catalyst and oligomerization catalyst are slurried or dissolved in a non-coordinating solvent and are then activated with MAO. In embodiments, the isomerization/oligomerization reaction can be carried out at similar temperatures and pressures as the direct oligomerization process.

In another alternate embodiment, the approach that is particularly useful for olefin feedstocks with modest amounts of primary olefins (<~20%) is to forego the direct oligomerization and subject the original olefin mixture to the isomerization/oligomerization catalyst. Oligomerization mixtures are upgraded through hydrogenation and distillation as described in U.S. patent application Ser. No. 12/511,796 which is hereby in its entirety incorporated by reference to produce fuels suitable for use in turbine or diesel engines.

Example: $Cp_2ZrCl_2$ and $NiCl_2$ are added to a reactor and activated by addition of 100 molar equivalents of MAO in toluene. The solution is allowed to react for one hour and the solvent along with residual $AlMe_3$ is removed under reduced pressure. Dry trans-2-butene is condensed onto the catalyst, the reactor is then sealed, and the solution is stirred for several hours at room temperature. The reaction is quenched with water, filtered, and the resultant distribution of oligomers is upgraded through hydrogenation and distillation.

FIG. 1 illustrates a method for the conversion of alcohol feedstocks to fully saturated turbine and diesel fuels. In the initial step, pure alcohols or mixtures are dehydrated to produce an olefin feedstock. This mixed feedstock can then be either directly oligomerized with an appropriate Ziegler Nana catalyst, or, depending on the distribution of olefins, can be isomerized and oligomerized with a bimetallic isomerization/oligomerization catalyst to produce a specific distribution of oligomers. In the case of direct oligomerization, residual olefins are separated by distillation and then subjected to isomerization/oligomerization conditions to further improve the yield of the process. Oligomer mixtures are then hydrogenated and distilled to produce fuels suitable for use in both turbine and diesel engines.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A process for manufacturing turbine and/or diesel fuels, comprising:
    providing an alcohol feedstock;
    dehydrating said alcohol with at least one solid catalyst at temperatures ranging from about 200° C. to about 400° C. to produce an olefin mixture;
    oligomerizing said mixture directly with at least one metallocene based Ziegler Natta catalyst and methylaluminoxane (MAO) cocatalyst to produce an oligomer mixture having unreacted olefins and oligomers;
    introducing an isomerization catalyst to produce in situ, a bimetallic isomerization/oligomerization catalyst to convert said unreacted olefins to oligomers formed through 1,2-addition, and
    hydrogenating and distilling said oligomers to produce fully saturated diesel and turbine fuels.

2. The process according to claim 1, wherein said alcohol feedstock is selected from the group consisting of pure alcohols, mixed alcohols, and complex mixtures including alcohols.

3. The process according to claim 1, wherein said alcohol is selected from the group having a $C_nH_{(2n+1)-x}(OH)_x$ formula where "n" and "x" are real integers greater than or equal to one.

4. The process according to claim 1, wherein said olefin mixture comprises moderately rich in primary olefins (ranging from about 20% to about 80%).

5. The process according to claim 1, wherein said alcohol feedstock comprises in primary olefins (greater than about 80%).

6. The process according to claim 1, wherein said isomerization catalyst comprises at least one modest Lewis acid that promotes isomerization without affecting said oligomerization process.

7. The process according to claim 1, wherein said isomerization catalyst comprises metals selected from the group consisting of nickel, platinum, palladium, and any combination thereof.

8. The process according to claim 1, wherein said isomerization catalyst comprises a transition metal with the metal in the +2 to +6 oxidation state selected from the group consisting of Ni, Zn, Pd, Pt, Cr, Cr, Fe, Fe, Mn, Co, and any combination thereof.

9. The process according to claim 1, further comprising the use of ligands with said isomerization catalysts.

10. The process according to claim 1, wherein said bimetallic catalyst having a Lewis acid:Metallocene ratio ranging from about 0.1 to about 10.

11. The process according to claim 1, wherein said bimetallic catalyst having a Lewis acid:Metallocene ratio ranging from about 0.5 to about 2.

12. The process according to claim 1, wherein said metallocene based Ziegler Natta catalyst and methylaluminoxane (MAO) cocatalyst are prepared with Al:Zr=from 1:1 to 1000:1.

13. The process according to claim 1, wherein said metallocene based Ziegler Natta catalyst and methylaluminoxane (MAO) cocatalyst are prepared with Al:Zr=from 1:1 to 100:1.

14. The process according to claim 1, wherein said dehydration catalyst is selected from the group consisting of gamma alumina, transition metal oxides, aluminum phosphate, and other heterogeneous catalysts having moderate acidity.

15. The process according to claim 1, wherein said olefin mixture comprises of 1-butene and 2-butene.

16. The process according to claim 1, wherein said unreacted internal olefins comprises either pure cis- or trans-2-butene or mixtures thereof.

17. The process according to claim 1, wherein said oligomers comprises a 1-butene chain.

18. The process according to claim 1, wherein said to produce oligomers formed through 1,2-addition are butene oligomers.

* * * * *